United States Patent [19]
Jeanson

[11] Patent Number: 4,586,725
[45] Date of Patent: May 6, 1986

[54] TRAILER FOR TAKING A BOAT OUT OF THE WATER AND TRANSPORTING IT

[75] Inventor: René H. Jeanson, Auzay, France

[73] Assignee: Valeo, Paris, France

[21] Appl. No.: 701,625

[22] Filed: Feb. 14, 1985

[30] Foreign Application Priority Data

Feb. 15, 1984 [FR] France ................................ 84 02278

[51] Int. Cl.$^4$ ................................................ B60P 3/10
[52] U.S. Cl. .................................... 280/414.1; 414/532
[58] Field of Search ............... 280/414.1, 414.2, 414.3, 280/414.5, 143, 144, 145, 146, 147; 414/532, 534

[56] References Cited

U.S. PATENT DOCUMENTS

| | | | |
|---|---|---|---|
| 2,827,304 | 3/1958 | Backus | 280/414.1 X |
| 3,067,892 | 12/1962 | Barrett et al. | 414/532 |
| 3,210,049 | 10/1965 | Holsclaw | 280/414.1 X |
| 3,603,465 | 9/1971 | King | 280/414.1 X |
| 4,209,279 | 6/1980 | Aasen | 280/414.1 X |
| 4,262,922 | 4/1981 | Nelson | 280/414.1 |
| 4,278,388 | 7/1981 | Johnson | 414/534 |

Primary Examiner—John J. Love
Assistant Examiner—Mitchell J. Hill
Attorney, Agent, or Firm—Roylance, Abrams, Berdo & Goodman

[57] ABSTRACT

The trailer of the invention comprises a chassis comprising two vertical pivots (14a, 14b) disposed symmetrically with respect to its longitudinal axis (15), two retainer arms (13a, 13b) mounted for pivoting on the pivots (14a, 14b) and intended to receive the front part of the hull of the boat (10) therebetween, an actuating cylinder (16) connecting the arms (13a, 13b) together at their front part, two pad holders (17a, 17b) pivotably mounted at the rear ends of the retainer arms (13a, 13b) and gripper pads (19a, 19b) pivotably mounted on the pad holders (17a, 17b). The retainer arms (13a, 13b) comprise identical toothed sectors (20a, 20b) centered on the pivots (14a, 14b) of the chassis and whose teeth are in engagement along the longitudinal axis (15) thereof. Furthermore, the pad holders (17b, 17b) are pivotably connected to auxiliary arms (21a, 21b) mounted for pivoting on the pivots (14a, 14b) of the chassis, these auxiliary arms comprising in their turn identical toothed sectors centered on the pivots (14b, 14b) of the chassis and whose teeth are also in engagement along the longitudinal axis (15) thereof.

The system of arms 12 provides perfect centering of the boat 10 on the trailer, which avoids a poor distribution of the load thereon and eliminates risks of overturning.

7 Claims, 5 Drawing Figures

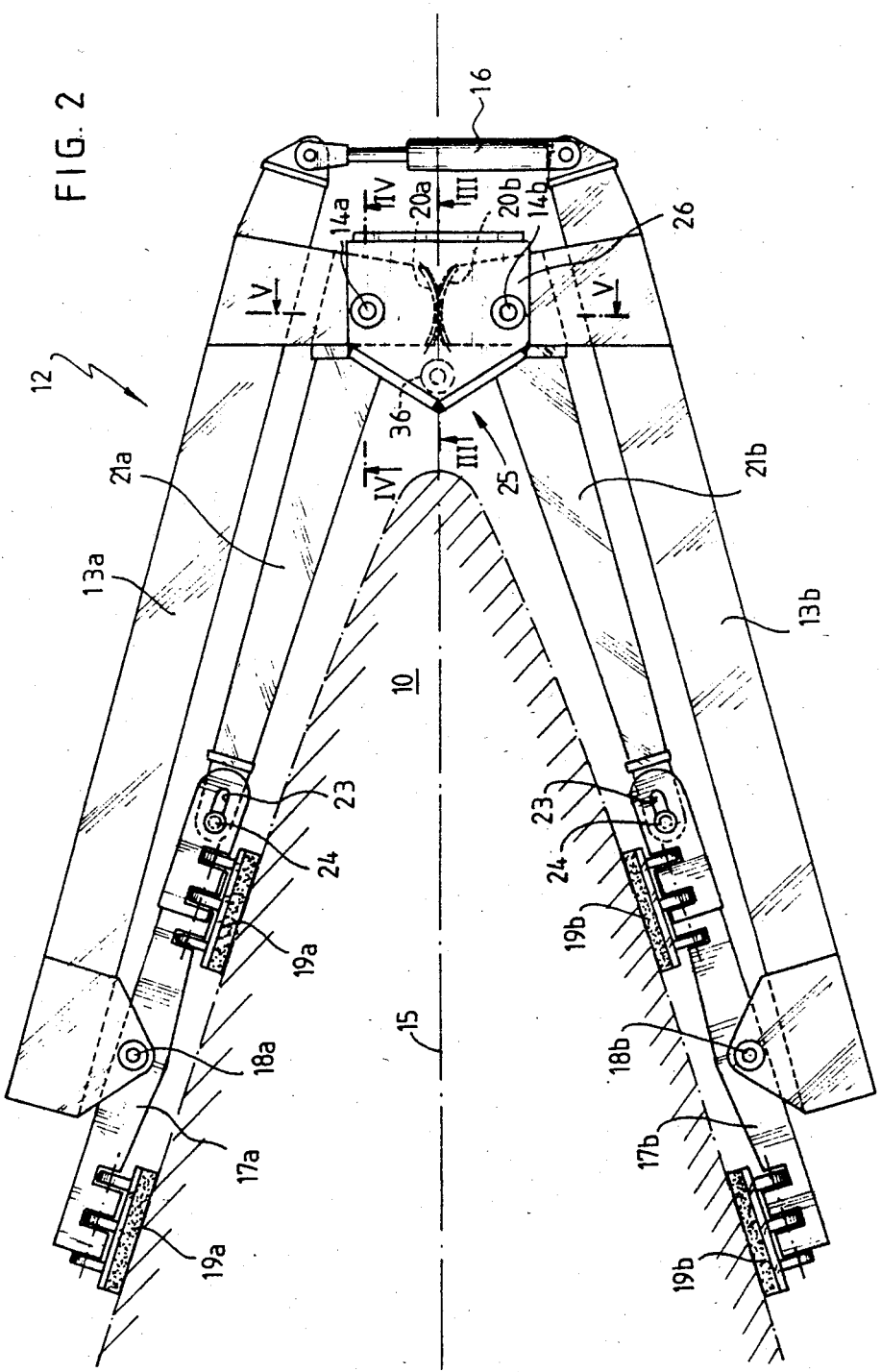

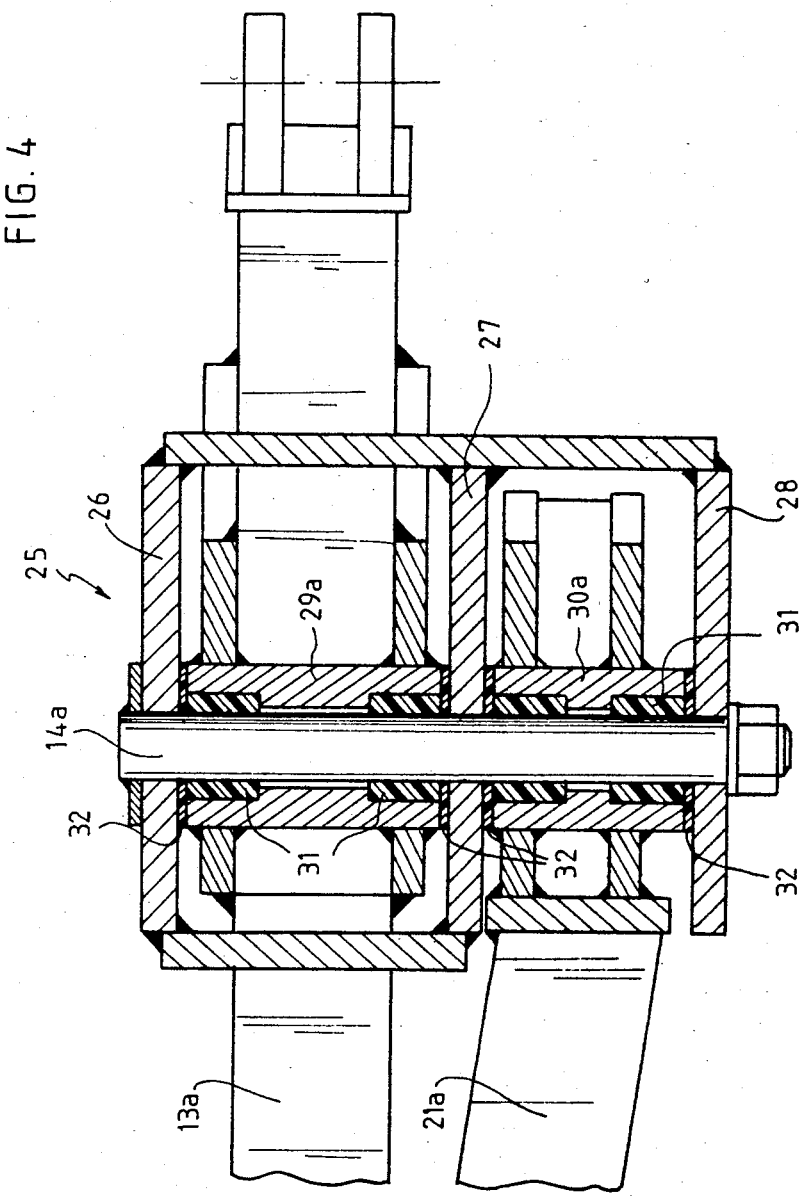

TRAILER FOR TAKING A BOAT OUT OF THE WATER AND TRANSPORTING IT

The present invention relates to a trailer for removing boats, particularly pleasure boats, out of the water and transporting them, comprising a chassis having two vertical pivots disposed symmetrically with respect to its longitudinal axis, two retainer arms pivotably mounted on said pivots, forming a V open towards the rear of the chassis and intended to receive the front part of the hull of the boat therebetween, an actuating cylinder connecting the arms together at their front part for positioning them or for causing them to pivot symmetrically with respect to the longitudinal axis of the chassis, two pad holders mounted for pivoting about vertical pivots provided at the rear ends of the retainer arms and gripping pads hingedly mounted on said pad holders.

Fitting a boat on a trailer is a very delicate operation. The operator must in fact carry out numerous manouvers for perfectly centering the boat on the trailer, so as to avoid a poor distribution of the load thereon and thus eliminate any risk of overturning during transport thereof.

The difficulties which are at present met with trailers of the above mentioned type stem essentially from the fact that the pad holders do not remain symmetrical with respect to the longitudinal axis of the trailer while the boat is being introduced between the retainer arms.

The present invention proposes overcoming these difficulties and, for this, it provides a trailer of the above mentioned type which is characterized in that the retainer arms comprise identical toothed sectors centered on the pivots of the chassis and whose teeth are in engagement along the longitudinal axis thereof, and in that the pad holders are connected for pivoting to auxiliary arms hingedly mounted on the pivots of the chassis, these auxiliary arms comprising in their turn identical toothed sectors centered on the pivots of the chassis and whose teeth are also in engagement along the longitudinal axis thereof.

With this set of arrangements, the two pad holders remain symmetrical with respect to the longitudinal axis of the chassis of the trailer whatever the angle formed by the two retainer arms. Perfect centering of the boat on the trailer may therefore now be obtained automatically. The risks of a poor distribution of the load on the trailer and possible overturning of the boat during transport thereof are consequently eliminated.

Preferably, the pad holder and the auxiliary arm which are situated on the same side of the longitudinal axis of the chassis are connected together by a vertical pin carried by one of them and projecting into a longitudinal slit formed in the other.

When the actuating cylinder causes the retainer arms to pivot, the pins move in the corresponding slits whereas the two pad holders remain symmetrical with respect to the longitudinal axis of the chassis although the angle which they form varies.

In a particular embodiment of the invention, the pivots of the chassis are carried by a frame comprising three horizontal superimposed plates, the retainer arms being hingedly mounted on these pivots between the upper plate and the intermediate plate whereas the auxiliary arms are hingedly mounted between the intermediate plate and the lower plate.

It should be noted here that the frame, because of its special configuration, facilitates mounting of the retainer arms and of the auxiliary arms on their respective pivots and confers great strength to the assembly.

Advantageously, the connecting arms and the auxiliary arms comprise sleeves fitted with a small play on the pivots of the chassis and whose ends each bear on a plate of the frame through a friction washer.

Pivoting of the connecting arms and of the auxiliary arms is of course facilitated by the presence of these friction washers.

So that the vibrations generated during movement of the trailer cannot reach the gripping pads and so the hull of the boat, a shock absorber centered on the longitudinal axis of the chassis is preferably interposed between this latter and the frame. This shock absorber also supports the weight of the assembly of retainer arms.

It is moreover desirable for the frame to be mounted for pivoting on the chassis about a horizontal shaft extending perpendicularly to the pivots of said chassis so as to allow the retainer arms to follow lowering of the boat during positioning thereof on the trailer.

According to another particular feature of the invention, each pad holder comprises at least two gripping pads each mounted for pivoting about a horizontal axis.

The gripping pads may thus be intimately applied against the hulls of boats having the most diverse profiles, which allows the trailer to be used for removing boats of all types from the water and transporting them.

One embodiment of the present invention will be described hereafter by way of non limitative example with reference to the accompanying drawings in which:

FIG. 1 a schematical side view of a trailer in accordance with the invention such as it is used for removing a boat from the water;

FIG. 2 a top view of the retainer arms, of the pad holders with their pads and of the auxiliary arms, the hull of a boat being shown with a dot dash line;

FIG. 4 is an enlarged view along line IV—IV of FIG. 2; and

Figure 1:
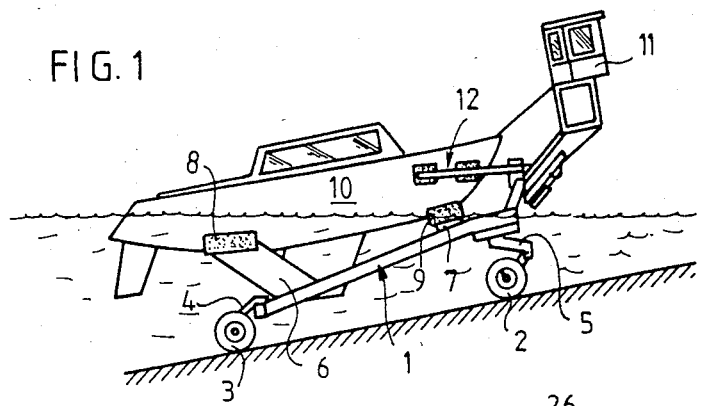

FIG. 1 shows schematically a trailer designed for taking pleasure boats or others out of the water and transporting them. This trailer comprises essentially a chassis 1 resting on front 2 and rear 3 wheels, lifting means 4, 5 provided at the level of the wheels for modifying the height of the chassis with respect to the ground, V shaped cradles 6, 7 ending in cushions 8, 9 for supporting the hull of the boat to be transported, a control post 11 movable in height so as to protect it from the water during introduction of the trailer under the boat, and a system of arms 12 provided at the front of the chassis for centering the boat thereon.

As can be seen particularly well in FIG. 2, the system of arms comprises two retainer arms 13a, 13b hingedly mounted on two vertical pivots 14a, 14b provided on chassis 1, these pivots being disposed symmetrically with respect to the longitudinal axis 15 thereof. The two retainer arms form a V open towards the rear so as to receive therebetween the front part of the hull of the boat 10 to be transported. They are connected together at their front part by an actuating cylinder 16 adapted for positioning them or causing them to pivot symmetrically with respect to the longitudinal axis 15 of the chassis. They are moreover each provided with a pad holder 17a, respectively 17b, mounted for pivoting in the vicinity of their rear end about a vertical pivot 18a, respectively 18b.

The pad holders 17a, 17b which are situated inside the angle formed by the two retainer arms 13a, 13b each have two pads 19a, respectively 19b, intended to come against the hull of the boat placed between the two retainer arms 13a, 13b. It will be noted here that pads 19a, 19b are each mounted for pivoting about a horizontal axis, which allows them to come into intimate contact with hulls of all shapes.

In accordance with the invention, the retainer arms 13a, 13b comprise identical toothed sectors 20a, 20b (see in particular FIG. 5) centered on the pivots 14a, 14b of the chassis and whose teeth are engaged along the longitudinal axis 15 thereof. Moreover, the pad holders 17a, 17b are pivotably connected to auxiliary arms 21a, 21b mounted for pivoting on the pivots 14a, 14b, these arms comprising in their turn identical toothed sectors 22a, 22b centered on pivots 14a, 14b and whose teeth are also in engagement along the longitudinal axis 15.

In the embodiment envisaged here, each of the pad holders 17a, 17b is provided at its front end with a longitudinal slot 23 into which projects a vertical pin 24 provided at the rear end of the corresponding auxiliary arm 21a or 21b. Pins 24 move in slots 23 when the cylinder 16 is actuated and thus allow the pad holders to pivot with respect to the auxiliary arms while remaining symmetrical with respect to the longitudinal axis 15 of the chassis.

It would of course still be within the scope of the present invention to provide longitudinal slots 23 at the rear end of the auxiliary arms 21a, 21b and the vertical pins 24 at the front end of the pad holders 17a, 17b.

Figure 3:
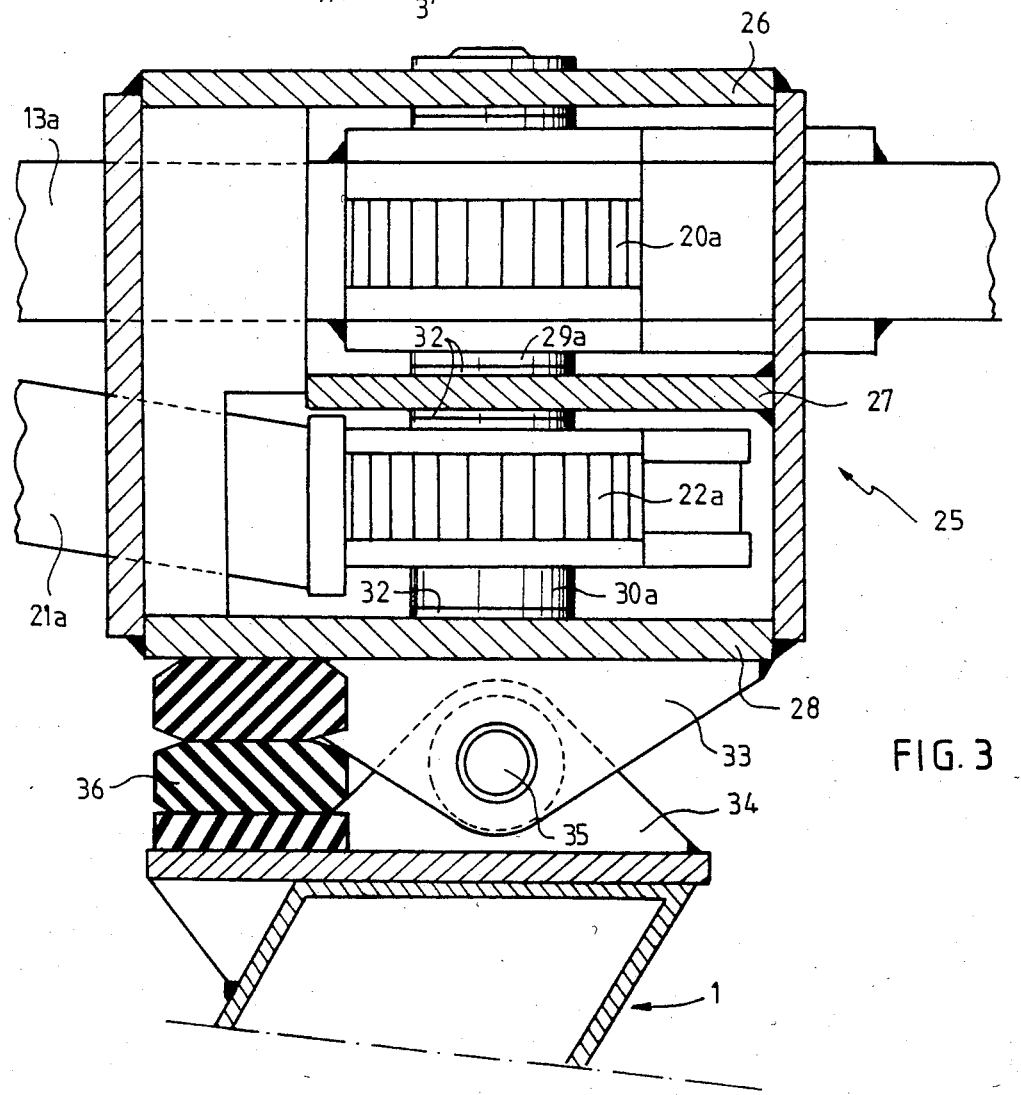
FIG. 3 is a enlarged view along line III—III of FIG. 2.
Figure 5:
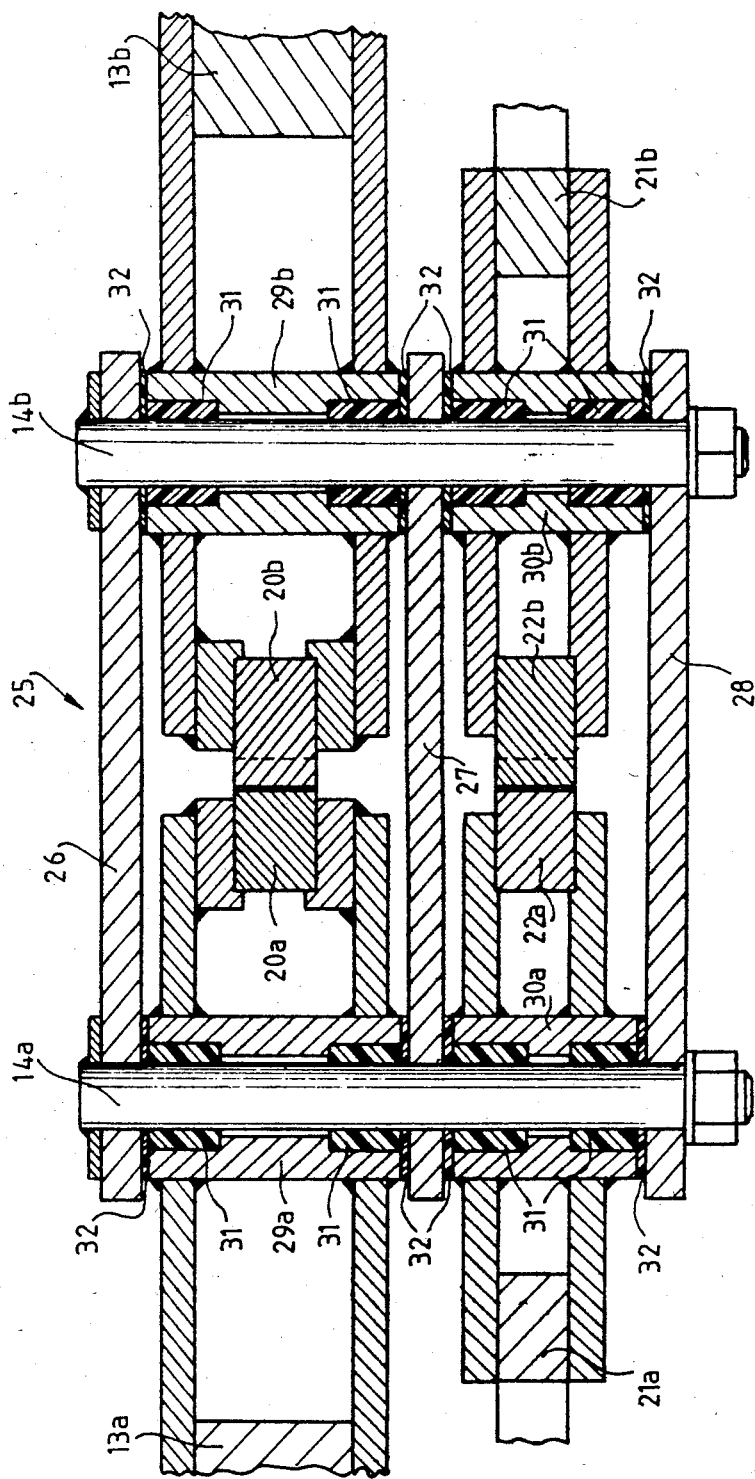
FIG. 5 is an enlarged view along line V—V of FIG. 2.

With reference more particularly to FIGS. 3 to 5, it will be noted that pivots 14a, 14b are supported by a frame 25 comprising three superimposed horizontal plates 26, 27, 28 and that the retainer arms 13a, 13b are mounted for pivoting on pivots 14a, 14b between the upper plate 26 and the intermediate plate 27 whereas the auxiliary arms 21a, 21b are mounted for pivoting between the intermediate plate 27 and the lower plate 28.

As shown in FIGS. 4 and 5, the retainer arms and the auxiliary arms comprise sleeves 29a, 29b respectively 30a, 30b, by means of which they are pivotably mounted on their respective pivot 14a, 14b, each sleeve comprising internal linings 31 and bearing on two horizontal plates of frame 25 through a friction washer 32 provided at each of its ends.

As shown moreover in FIG. 3, the lower plate 28 of frame 25 has on its lower face a vertical fork joint 33 extending parallel to the longitudinal axis 15 of the chassis and receiving between its flanges a vertical plate 34 projecting from said chassis 1. A pin 35 perpendicular to the longitudinal axis 15 connects the fork joint 33 to the plate 34 and thus allows the frame 25 to be pivotably connected to chassis 1 thus allowing the retainer arms to follow the movement of the boat during positioning thereof on the trailer.

For the sake of completeness, it will be noted that a shock absorber 36 centered on the longitudinal axis 15 is interposed between frame 1 and the lower plate 28 of frame 25, on the one hand to prevent the vibrations generated during movement of the trailer from reaching the boat and, on the other hand, for supporting the weight of the retainer arm assembly.

The trailer of the present invention comprises a system of arms 12 allowing perfect centering of the boat to be transported. In fact, because of the toothed sectors 20a, 20b of the retainer arms 13a, 13b and because of the auxiliary arms 21a, 21b, the pad holders 17a, 17b remain symmetrical with respect to the longitudinal axis 15 of the chassis, whatever the value of the angle formed by the retainer arms 13a, 13b.

The risks of the trailer overturning accidently because of a poor distribution of the load resting thereon are thus eliminated, through a relatively simple technical solution.

I claim:

1. A trailer for taking boats, more especially pleasure boats, out of the water and transporting them, comprising a chassis (1) comprising two vertical pivots (14a, 14b) disposed symmetrically with respect to its longitudinal axis (15), two retainer arms (13a, 13b) pivotably mounted on pivots (14a, 14b) and forming a V open towards the rear of the chassis and intended to receive the front part of the hull of the boat (10) therebetween, an actuating cylinder (16) connecting the arms (13a, 13b) together at their front part for positioning them or causing them to pivot symmetrically with respect to the longitudinal axis (15) of the chassis, two pad holders (17a, 17b) mounted for pivoting about vertical pivots (18a, 18b) provided at the rear ends of the retainer arms (13a, 13b), and gripper pads (19a, 19b) pivotably mounted on the pad holders (17a, 17b), characterized in that the retainer arms (13a, 13b) comprise identical toothed sectors (20a, 20b) centered on the pivots (14a, 14b) of the chassis (1) and whose teeth are in engagement along the longitudinal axis (15) thereof, and in that the pad holders (17a, 17b) are pivotably connected to auxiliary arms (21a, 21b) mounted for pivoting on the pivots (14a, 14b) of the chassis (1), these auxiliary arms comprising in their turn identical toothed sectors (22a, 22b) centered on the pivots (14a, 14b) of the chassis (1) and whose teeth are also in engagement along the longitudinal axis (15) thereof.

2. The trailer according to claim 1, characterized in that the pad holder (17a, respectively 17b) and the auxiliary arm (21a, respectively 21b) which are situated on the same side of the longitudinal axis (15) of the chassis (1) are connected together by a vertical pin (24) carried by one of them and projecting into a longitudinal slot (23) formed in the other.

3. Trailer according to claim 2, characterized in that the pivots (14a, 14b) of the chassis (1) are carried by a frame (25) comprising three superimposed horizontal plates (26, 27, 28,) the retainer arms (13a, 13b) being mounted for pivoting on these pivots (14a, 14b) between the upper plate (26) and the intermediate plate (27) whereas the auxiliary arms (21a, 21b) are pivotably mounted between the intermediate plate (27) and the lower plate (28).

4. Trailer according to claim 3, characterized in that the connecting arms (13a, 13b) and the auxiliary arms (21a, 21b) comprise sleeves (29a, respectively 29b) fitted with a slight play on the pivots (14a, respectively 14b) of the chassis (1) and whose ends each bear on a plate of the frame (25) through a friction washer.

5. Trailer according to claim 4, characterized in that a shock absorber (36) centered on the longitudinal axis (15) of the chassis (1) is interposed between said chassis and the frame (25).

6. Trailer according to claim 5, characterized in that the frame (25) is mounted on the chassis (1) for pivoting about a horizontal pin (35) extending perpendicularly to the pivots (14a, 14b) of said, chassis (1).

7. Trailer according to claim 6, characterized in that each pad holder (17a, respectively 17b) comprises at least two gripper pad (19a, respectively 19b) each mounted for pivoting about a horizontal axis.

* * * * *